(12) United States Patent
Urban et al.

(10) Patent No.: US 6,813,981 B2
(45) Date of Patent: Nov. 9, 2004

(54) APPARATUS AND METHOD FOR CUTTING CABLES AND WIRES

(75) Inventors: Blake R. Urban, Lenior, NC (US); Issac D. M. White, Orlando, FL (US); James E. Dickens, Ocoee, FL (US); Kevin Forsberg, Orlando, FL (US); Charles Sawyer, Orlando, FL (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/306,995

(22) Filed: Nov. 30, 2002

(65) Prior Publication Data

US 2004/0103539 A1 Jun. 3, 2004

(51) Int. Cl.$^7$ .................................................. H02G 1/12
(52) U.S. Cl. .............................. 83/13; 30/90.1; 30/90.6
(58) Field of Search .............................. 30/91.1, 90.6, 30/91.2, 90.4, 90.8, 90.2, 293, 155, 90.1; 81/9.5, 9.51, 9.44, 9.41; 29/828; 83/13

(56) References Cited

U.S. PATENT DOCUMENTS

| | | | | |
|---|---|---|---|---|
| 2,817,255 A | * | 12/1957 | Lormeau | .................... 30/91.2 |
| 2,875,516 A | | 3/1959 | Parks | |
| 2,903,064 A | * | 9/1959 | Blonder | ...................... 30/90.6 |
| 3,366,619 A | * | 1/1968 | De Lucia | ..................... 534/760 |
| 4,081,871 A | * | 4/1978 | Knuth | ........................... 7/107 |
| 4,242,929 A | | 1/1981 | Bobby | |
| 4,433,484 A | * | 2/1984 | Antisdel et al. | .............. 30/90.4 |
| 4,640,009 A | * | 2/1987 | Liversidge | .................... 29/828 |
| 4,805,302 A | | 2/1989 | Steiner | |
| 5,009,130 A | * | 4/1991 | Bieganski | ...................... 81/9.4 |
| 5,182,859 A | | 2/1993 | Yoshimori | |
| 5,325,587 A | | 7/1994 | Steiner | |
| 5,337,479 A | * | 8/1994 | Ducret | ........................ 30/90.6 |
| 5,398,413 A | | 3/1995 | Chen | |
| 5,813,083 A | * | 9/1998 | Gould | ...................... 15/236.01 |
| 6,058,606 A | | 5/2000 | Hepworth | |
| 6,138,362 A | | 10/2000 | Yoshimori | |
| 6,253,641 B1 | | 7/2001 | Tarpill | |
| 6,427,275 B1 | | 8/2002 | Hung | |
| 6,510,611 B2 | * | 1/2003 | Edwards et al. | .............. 30/90.6 |

* cited by examiner

*Primary Examiner*—Allan N. Shoap
*Assistant Examiner*—Ghassem Alie
(74) *Attorney, Agent, or Firm*—Walters & Zimmerman; Geoff Sutcliffe; Todd Mitchem

(57) ABSTRACT

An apparatus and a method are disclosed for cutting cable. The apparatus has an elongate handle with a longitudinal axis extending from a first to a second end. An eyelet extends from the second end and defines an opening through which the cable is inserted. A first cutting surface slides within the elongate handle and extends beyond the inner wall of the eyelet. When the end of the cable is inserted into the opening of the eyelet, the first cutting surface may be extended beyond the inner wall of the eyelet and into contact with the cable. As the handle is rotated about the cable, the first cutting surface cuts the cable. A second cutting surface may protrude from the handle for slitting an outer sheath of the cable.

4 Claims, 7 Drawing Sheets

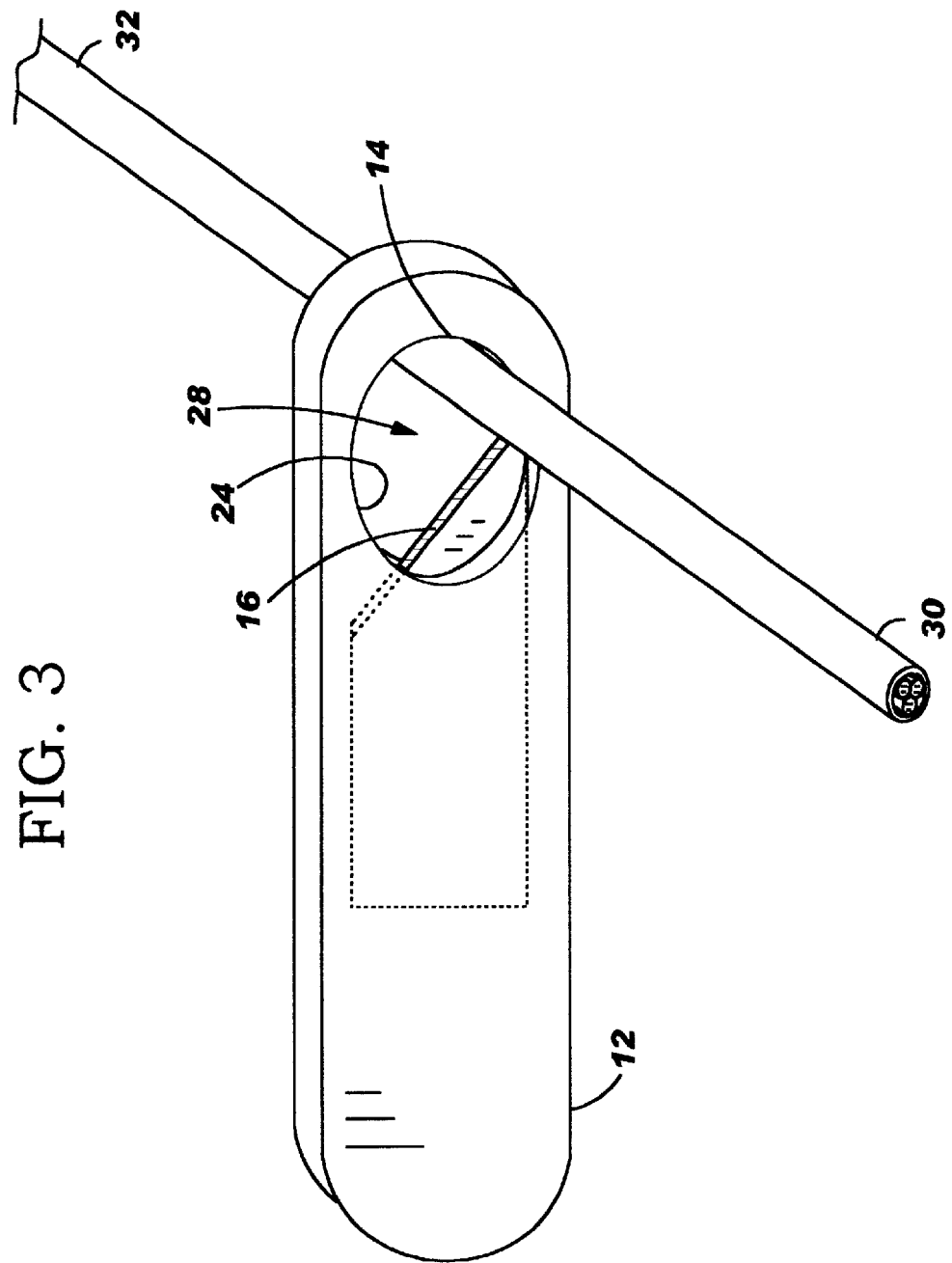

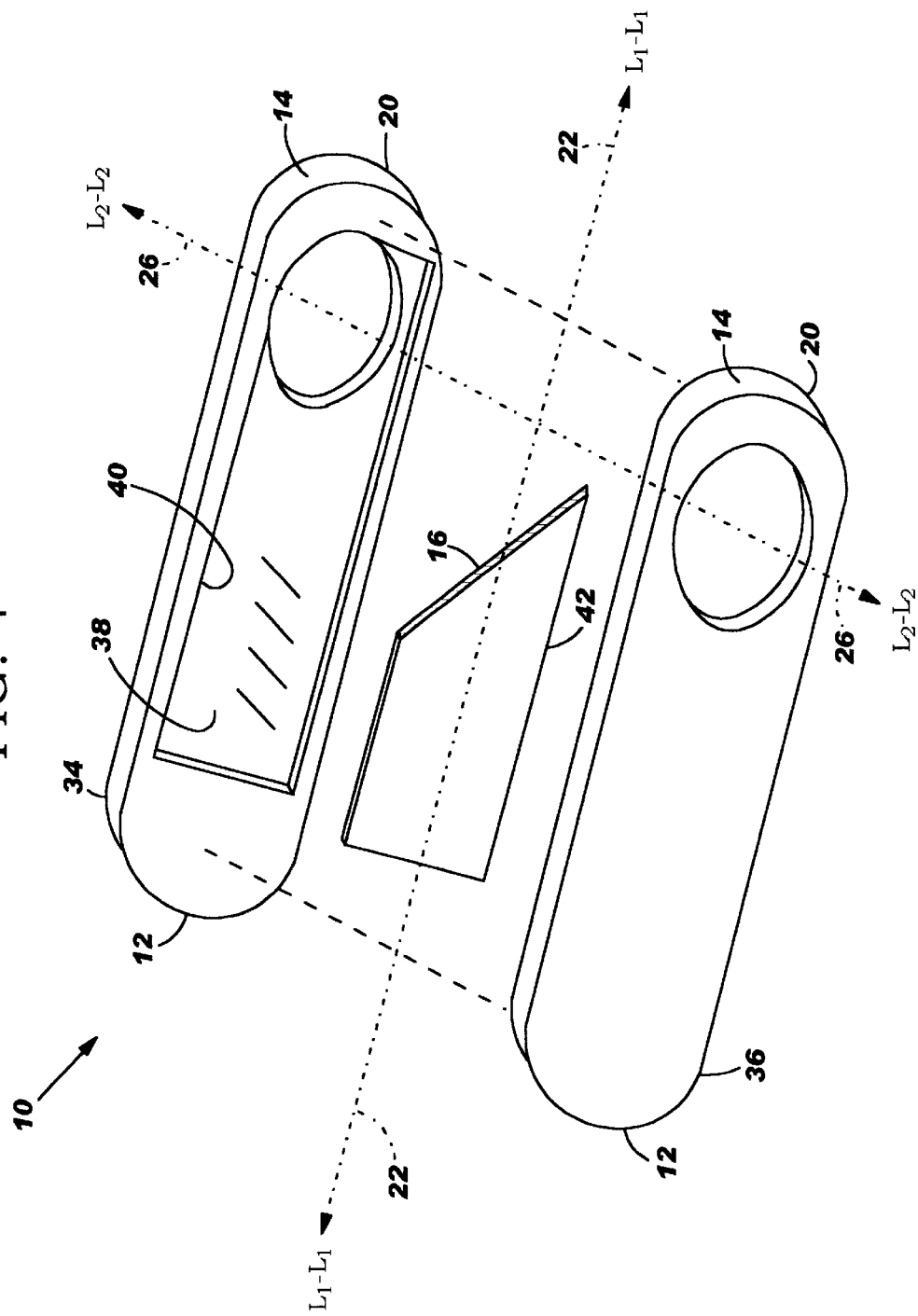

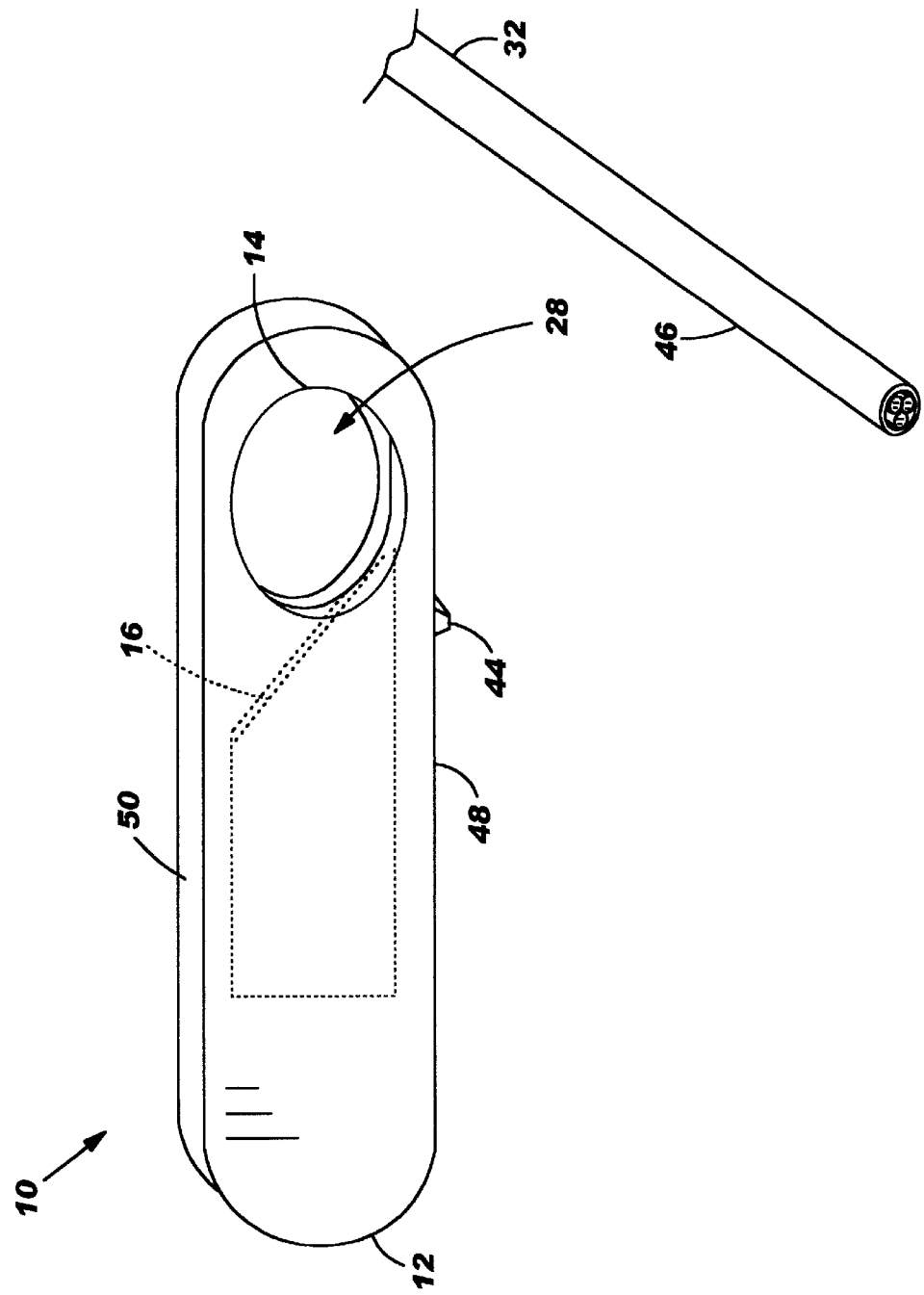

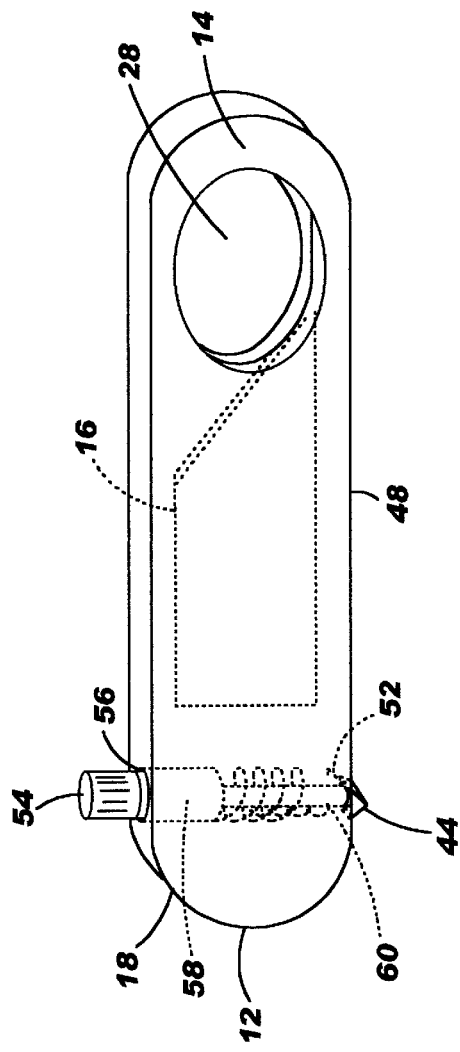
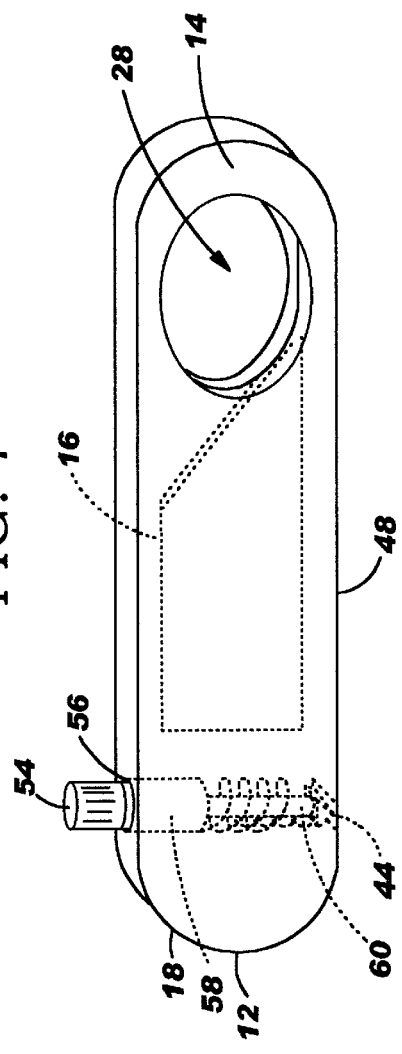

US 6,813,981 B2

APPARATUS AND METHOD FOR CUTTING CABLES AND WIRES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to hand tools and, more particularly, to cutlery for cutting strand-encircling sheath.

2. Description of the Related Art

Hand tools have been used to cut electrical wires and cables. These hand tools are often designed to cut coaxial cable, copper conductors, fiber optic cables, and other combinations of cable. Some of these hand tools are designed to strip insulation from the cable and wire, and some of these hand tools are also designed to crimp connectors onto the cut and stripped cable and wire. Although these hand tools have long been used, these prior art hand tools have a common problem. These prior art hand tools do not adequately shield the cutting surface. As the technician uses these prior art hand tools, the technician's fingers are often cut by the cutting surface. There is, accordingly, a need for a hand tool that shields the technician's fingers from the cutting surface while cutting and stripping electrical wires and cables.

BRIEF SUMMARY OF THE INVENTION

The aforementioned problems, and other problems, are reduced by an apparatus and method for cutting cable. This invention is an apparatus that allows a technician to cut cables and wires, yet this invention protects the technician's fingers from the cutting surface. This invention also allows the technician to quickly and to easily slit an outer sheath of the cables and wires. One embodiment of this invention describes an apparatus for cutting cable. This apparatus comprises an elongate handle, an eyelet extending from the handle, and a first cutting surface sliding within the handle. The elongate handle has a first end and a second end. The elongate handle defines a longitudinal axis extending from the first end to the second end. The eyelet extends from the second end of the elongate handle, and the eyelet has an inner wall defining an axis of the eyelet. The inner wall of the eyelet also defines an opening through which an end of the cable is inserted. A first cutting surface slides within a hollow interior portion of the elongate handle. The first cutting surface slides between a first position and a second position. The first position retracts the first cutting surface within the hollow interior portion of the elongate handle, and the second position extends the first cutting surface beyond the inner wall of the eyelet. When the end of the cable is inserted into and through the opening of the eyelet, the first cutting surface may be slid to extend beyond the inner wall of the eyelet and into contact with the cable. As the handle is rotated about the cable, the first cutting surface cuts the cable.

Another embodiment of this invention describes a method for cutting cable. An end of the cable is inserted into an eyelet of a handle. A first cutting surface extends from within the handle and into contact with the cable. The handle is rotated around the cable to cut the cable. The cut cable is then positioned to a second cutting surface protruding from the handle. The handle is slid along an outer sheath of the cable such that the second cutting surface slices the outer sheath.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein:

FIGS. 2 and 3 are schematics showing two positions of the apparatus shown in FIG. 1;

FIG. 4 is an exploded view of the apparatus shown in FIGS. 1–3;

FIG. 5 is a schematic showing an alternative embodiment of this invention;

FIGS. 6 and 7 are schematics showing another alternative embodiment of this invention.

DETAILED DESCRIPTION OF THE INVENTION

Figure 1:
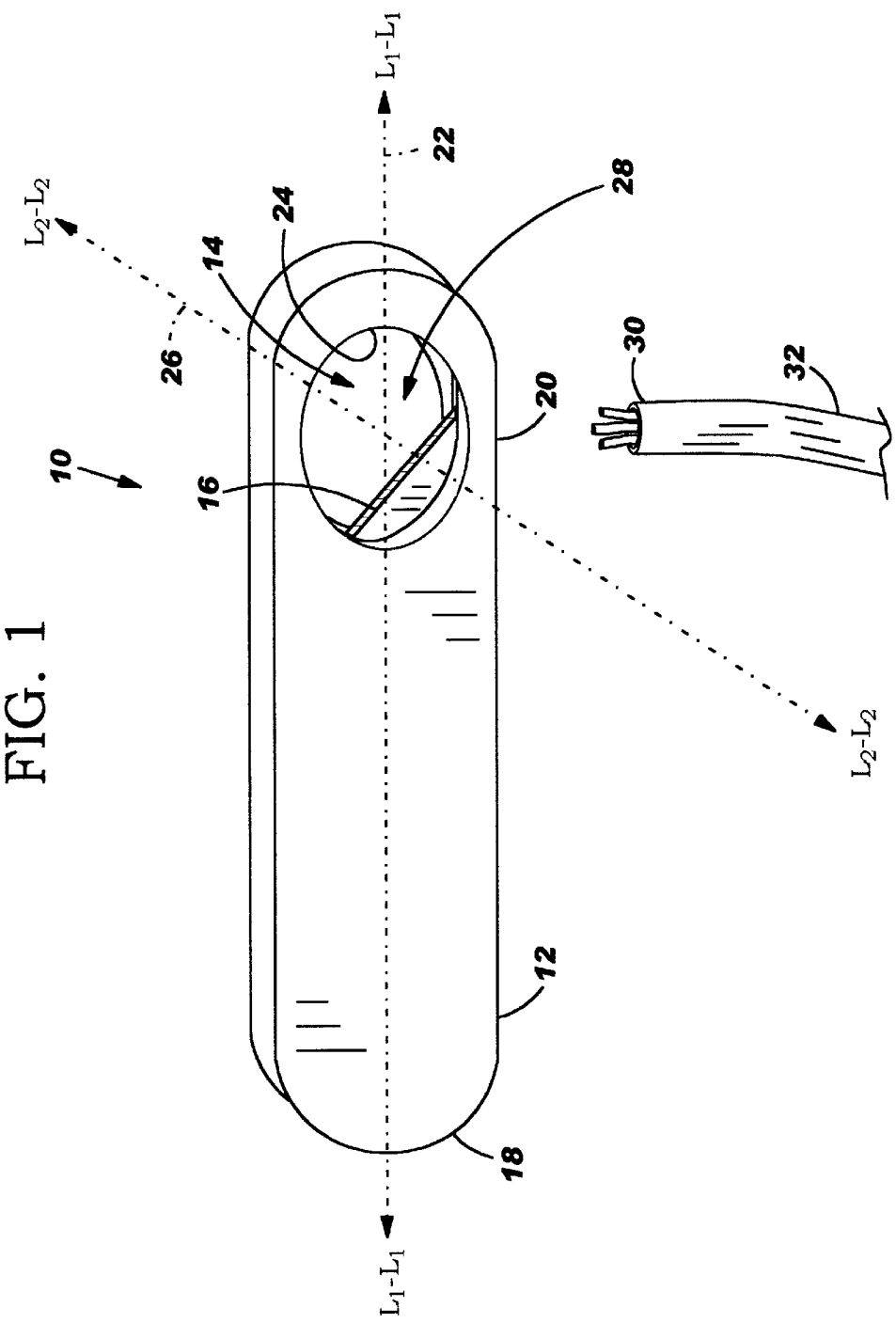
FIG. 1 is a schematic illustrating an apparatus according to this invention.

FIG. 1 is a schematic illustrating an apparatus 10 according to this invention. The apparatus 10 comprises an elongate handle 12, a single eyelet 14 extending from the handle 12, and a first cutting surface 16 sliding within the handle 12. The elongate handle 12 has a first end 18 and a second end 20. The elongate handle 10 defines a longitudinal axis $L_1$—$L_1$ (shown as reference numeral 22) extending from the first end 18 to the second end 20. The eyelet 14 extends from the second end 20 of the elongate handle 10. The eyelet 14 has an inner wall 24 defining an axis $L_2$—$L_2$ (shown as reference numeral 26) of the eyelet. The inner wall 24 of the eyelet 14 also defines an opening 28 through which an end 30 of a cable 32 is inserted.

Figure 2:
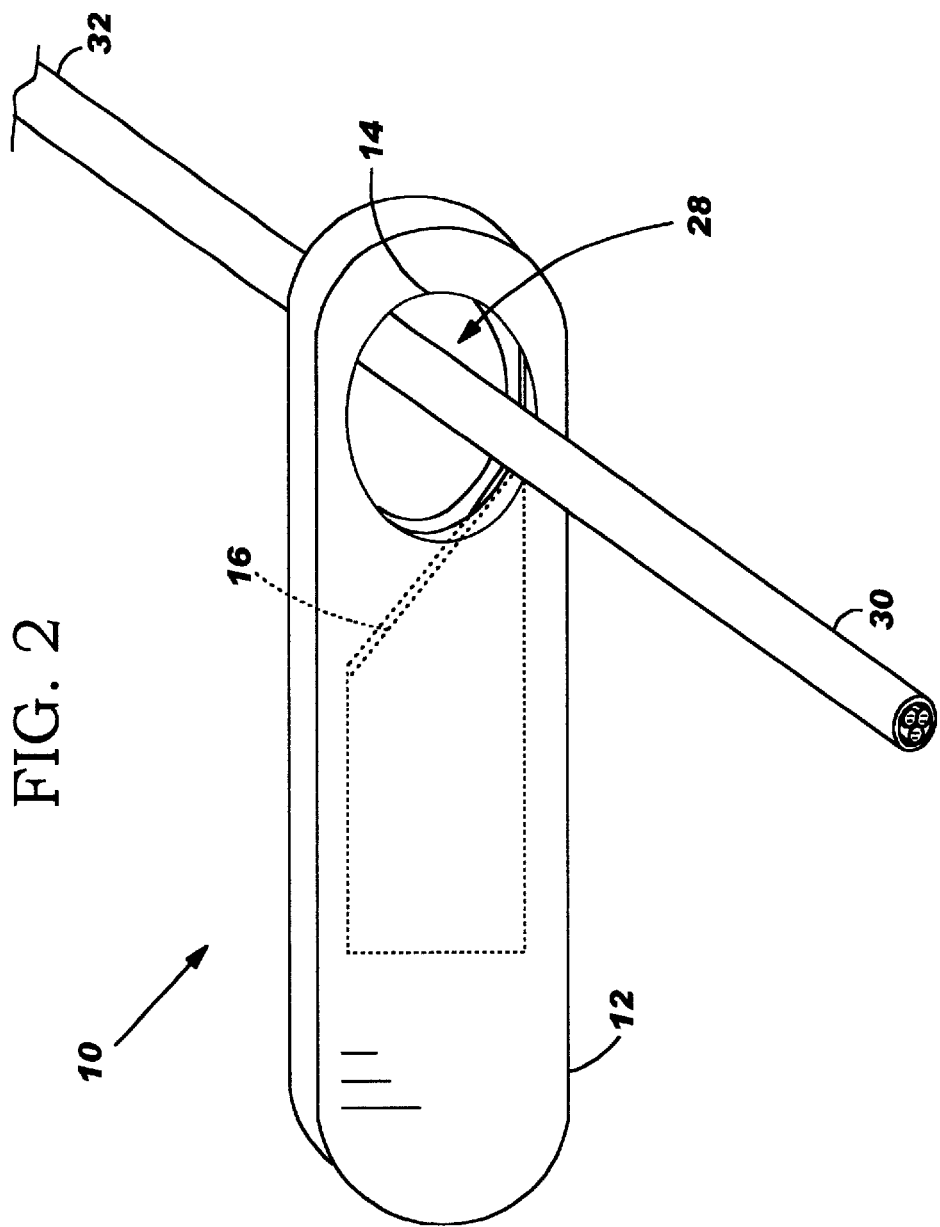

FIGS. 2 and 3 are schematics showing two positions of the first cutting surface 16. FIG. 2 shows a first position of the first cutting surface 16, while FIG. 2 shows a second position of the first cutting surface 16. FIG. 2 shows the first cutting surface 16 retracted within a hollow interior portion of the elongate handle 12. When the first cutting surface 16 is in retracted to this first position, the end 30 of the cable 32 may be inserted into and through the opening 28. FIG. 3, then, shows the second position of the first cutting surface 16. This second position has the first cutting surface 16 extending beyond the inner wall 24 of the eyelet 14. When the end 30 of the cable 32 is inserted into and through the opening 28 of the eyelet 14, the first cutting surface 16 slides to extend beyond the inner wall 24 of the eyelet 14 and into contact with the cable 32. As the handle 12 is rotated about the cable 32, the first cutting surface 16 cuts the cable 32. FIGS. 2 and 3 also illustrate the protective feature of this invention. The eyelet 14 surrounds the first cutting surface 16, thus creating a safety shield around the first cutting surface. The eyelet 14 protects a technician's fingers from the sharp first cutting surface 16.

FIG. 4 is an exploded view of the apparatus 10 shown in FIGS. 1–3. The elongate handle 12 comprises right half 34 and a left half 36. The right 34 and left 36 halves fit together in a clam shell arrangement. The first cutting surface 16 slides within a hollow interior portion 38 of the elongate handle 12. This hollow interior portion 38 of the handle 12 resembles a channel 40 into which the first cutting surface 16 reposes. The first cutting surface 16 is typically a replaceable razor blade 42. When the right 34 and left 36 halves are separated, the razor blade 42 may be removed from the channel 40 and replaced with a fresh, sharp blade. The first cutting surface 16 slides along the longitudinal axis $L_1$—$L_1$ (shown as reference numeral 22) of the handle 12. The eyelet 14 extends from the second end 20 of the elongate handle 12, such that the axis $L_2$—$L_2$ (shown as reference numeral 26) of the eyelet 14 is aligned along the longitudinal axis $L_1$—$L_1$ of the handle 12.

FIG. 5 is a schematic showing an alternative embodiment of the apparatus 10 according to this invention. Here the apparatus 10 comprises a second cutting surface 44 protruding from the handle 12. This second cutting surface 44 allows a user to slit an outer sheath 46 of the cable 32. The cable 32 is positioned to the second cutting surface 44, and the handle is slid along the outer sheath of the cable such that the second cutting surface 44 slices the outer sheath. Because the second cutting surface 44 is designed to only slice the outer sheath 46 of the cable 32, the second cutting surface 44 protrudes from the handle 12 an amount not exceeding about one eighth of an inch (0.125 inch). Although FIG. 5 shows the second cutting surface 44 protruding from a bottom surface 48 of the handle 12, the second cutting surface 44 could also protrude from a top surface 50 of the handle 12.

FIGS. 6 and 7 are schematics showing another alternative embodiment of the apparatus 10 according to this invention. Here the second cutting surface 44 protrudes from the bottom surface 48 at the first end 18 of the handle 12. The second cutting surface 44, however, has a first position and a second position. FIG. 6 shows the first position having the second cutting surface 44 protruding from an aperture 52 in the handle 12, while FIG. 7 shows the second position having the second cutting surface 44 retracted within the handle 12. A push button 54 extends from a top aperture 56 in the top surface 50 of the handle 12. The push button 54 and the second cutting surface 44 are connected by a so-called "double-clicking mechanism" 58. This double-clicking mechanism 58 resembles a clicking-type ball point pen assembly. A clicking rod 60 is projected by depression of the push button 54, and the clicking rod 60 is retracted by another depression of the push button 54. A return spring 62 provides a biasing force that urges the clicking rod 60 upward.

The apparatus 10, shown in FIGS. 1–7, may also comprise means for extending and retracting the first cutting surface 16. A thumb slide, for example, would allow a person to single-handedly hold the apparatus 10 and, yet, extend and retract the first cutting surface 16. The thumb slide would connect to the first cutting surface 16 and slide along a slot in an outer surface of the handle 12. The means for extending and retracting the first cutting surface 16 may also include one or more springs to bias the first cutting surface 16 to the retracted or the extended position. The elongate handle 12 may also include a graduated portion for measuring the extension of the first cutting surface 16 beyond the inner wall 24 of the eyelet 14.

Figure 8:
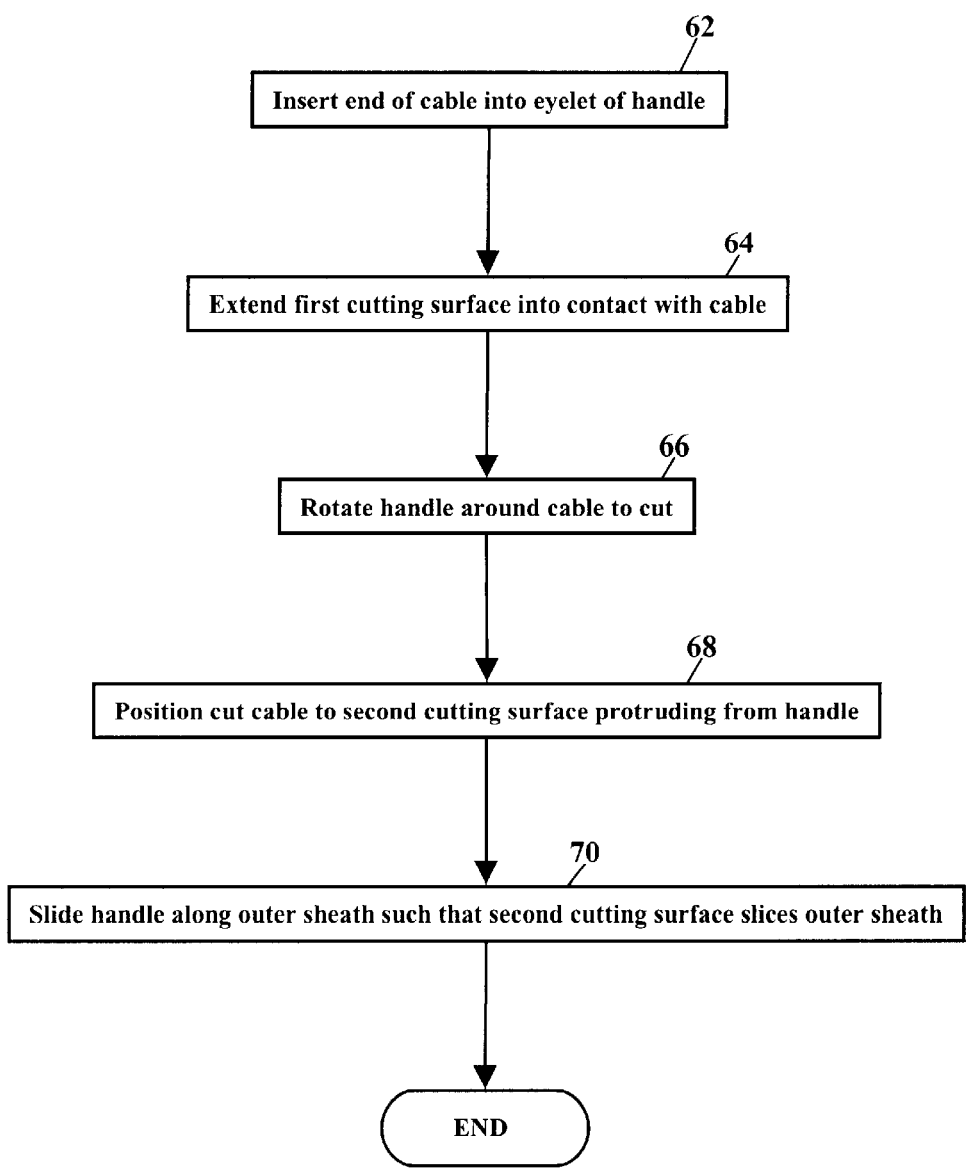
FIG. 8 is a flowchart illustrating a method for cutting cable.

FIG. 8 is a flowchart illustrating a method for cutting cable. An end of the cable is inserted into an eyelet of a handle (Block 62). A first cutting surface extends from within the handle and into contact with the cable (Block 64). The handle is rotated around the cable to cut the cable (Block 66). The cut cable is then positioned to a second cutting surface protruding from the handle (Block 68). The handle is slid along an outer sheath of the cable (Block 70) such that the second cutting surface slices the outer sheath.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method for cutting a cable, comprising:

inserting an end of the cable into an eyelet of a handle;

extending a first cutting surface into contact with the cable;

rotating the handle around the cable to cut the cable;

pushing a button of a double-clicking mechanism to extend a second cutting surface from the handle, the second cutting surface for slitting an outer sheath of the cable, wherein depression of the push button causes the double-clicking mechanism to extend the second cutting surface to the first position, and wherein another depression of the push button causes the double-clicking mechanism to retract the second cutting surface to the second position, positioning the cable to the second cutting surface protruding from the handle; and sliding the handle along an outer sheath of the cable such that the second cutting surface slices the outer sheath.

2. An apparatus for cutting cable, comprising:

an elongate handle having a first end and a second end, the elongate handle defining a longitudinal axis extending from the first end to the second end;

an eyelet extending from the second end of the elongate handle, the eyelet having an inner wall defining an axis of the eyelet, the inner wall of the eyelet also defining an opening through which an end of the cable is inserted;

a first cutting surface sliding within a hollow interior portion of the elongate handle, the first cutting surface sliding to retract within the hollow interior portion of the elongate handle, the first cutting surface also sliding to extend beyond the inner wall of the eyelet;

a second cutting surface for slitting an outer sheath of the cable, the second cutting surface having a first position and a second position, the first position having the second cutting surface protrude from the handle, and the second position having the second cutting surface retract within the handle; and a double-clicking mechanism connecting a push button to the second cutting surface, wherein depression of the push button causes the double-clicking mechanism to extend the second cutting surface to the first position, and wherein another depression of the push button causes the double-clicking mechanism to retract the second cutting surface to the second position, wherein when the end of the cable is inserted into and through the opening of the eyelet, the first cutting surface may be slid to extend beyond the inner wall of the eyelet and into contact with the cable, and as the handle is rotated about the cable, the first cutting surface cuts the cable.

3. An apparatus according to claim 2, wherein the eyelet extends from the second end of the elongate handle such that the axis of the eyelet is aligned along the longitudinal axis of the handle.

4. An apparatus according to claim 2, wherein the first cutting surface slides along the longitudinal axis of the handle, the first cutting surface sliding between the first position and the second position.

\* \* \* \* \*